(12) United States Patent
Lazarevic et al.

(10) Patent No.: US 8,709,138 B2
(45) Date of Patent: Apr. 29, 2014

(54) FILTER MEDIUM FOR PARTICULATE FILTRATION

(75) Inventors: Alexandra Lazarevic, Weinheim (DE); Robert Bader, Heidelberg (DE); Rosemarie Kurzer, Otterberg (DE); Heinz Reinhardt, Edingen (DE)

(73) Assignee: Carl Freudenberg KG, Weinheim (DE)

(*) Notice: Subject to any disclaimer, the term of this patent is extended or adjusted under 35 U.S.C. 154(b) by 526 days.

(21) Appl. No.: 13/127,002

(22) PCT Filed: Oct. 5, 2009

(86) PCT No.: PCT/EP2009/007104
§ 371 (c)(1),
(2), (4) Date: Apr. 29, 2011

(87) PCT Pub. No.: WO2010/049052
PCT Pub. Date: May 6, 2010

(65) Prior Publication Data
US 2011/0209619 A1    Sep. 1, 2011

(30) Foreign Application Priority Data

Oct. 31, 2008 (DE) .................. 10 2008 054 137

(51) Int. Cl.
*B03C 3/28* (2006.01)

(52) U.S. Cl.
USPC .............. 96/15; 55/486; 55/528; 55/DIG. 39; 96/67; 96/68; 96/69; 96/154; 442/414; 442/417

(58) Field of Classification Search
USPC .............. 96/15, 17, 67–69, 154; 55/486, 497, 55/521, 527, 528, DIG. 5, DIG. 39; 210/243, 489–491, 493.5, 502.1; 442/414, 417
See application file for complete search history.

(56) References Cited

U.S. PATENT DOCUMENTS

| 4,657,804 | A  | * | 4/1987 | Mays et al. .................. 428/212 |
| 5,645,057 | A  | * | 7/1997 | Watt et al. ................ 128/206.12 |
| 6,123,752 | A  |   | 9/2000 | Wu et al. |
| 6,395,046 | B1 | * | 5/2002 | Emig et al. ...................... 55/382 |
| 6,524,360 | B2 | * | 2/2003 | Cox et al. ......................... 55/382 |
| 6,858,057 | B2 | * | 2/2005 | Healey ............................ 55/528 |
| 7,309,522 | B2 | * | 12/2007 | Webb et al. ................ 428/292.1 |

(Continued)

FOREIGN PATENT DOCUMENTS

| EP | 0 338 479 | 10/1989 |
| EP | 1 366 791 | 12/2003 |

(Continued)

OTHER PUBLICATIONS

International Search Report from corresponding PCT Application No. PCT/EP2009/007104 dated Mar. 4, 2010.

*Primary Examiner* — Richard L Chiesa
(74) *Attorney, Agent, or Firm* — Grossman, Tucker, Perreault & Pfleger, PLLC (57) ABSTRACT

A filter medium including a carrier layer and a microfiber layer applied thereon is characterized in that, with respect to the aim of providing a filter medium which has a relatively low pressure drop, and at the same time a good fraction separation rate and excellent dust storage capacity, the carrier layer has first fibers, which are designed as endless bicomponent fibers and spunbonded fibers, and the microfiber layer has second fibers, which are designed as endless melt-blown fibers.

16 Claims, 11 Drawing Sheets

(56) References Cited

U.S. PATENT DOCUMENTS

| | | |
|---|---|---|
| 7,413,803 B2 * | 8/2008 | Jordan et al. ............... 428/373 |
| 2004/0116018 A1 * | 6/2004 | Fenwick et al. ............ 442/164 |
| 2005/0095943 A1 * | 5/2005 | Griffin et al. .............. 442/352 |
| 2005/0235619 A1 | 10/2005 | Heinz et al. |
| 2006/0269748 A1 * | 11/2006 | Jordan et al. ............... 428/364 |
| 2010/0101199 A1 | 4/2010 | Veeser et al. |

FOREIGN PATENT DOCUMENTS

| | | | |
|---|---|---|---|
| JP | 5-329397 A * | 12/1993 | ............ 55/DIG. 39 |
| JP | 2002-524226 | 8/2002 | |
| WO | 2004/028662 | 4/2004 | |
| WO | 2008/107006 | 9/2008 | |

\* cited by examiner

FILTER MEDIUM FOR PARTICULATE FILTRATION

TECHNICAL FIELD

The invention relates to a filter medium comprising a carrier layer and a microfiber layer applied to the carrier layer.

STATE OF THE ART

A filter medium of similar type is already known from EP 1 366 791 B 1. Here, a fine structure layer, which presents electrostatically spun fibers in the nanometer range, is applied on a carrier layer. However, this filter medium presents only a relatively low dust storage capacity.

The known filter media, during use, present a relatively large pressure drop, a frequently insufficient fractional particle efficiency, and only insufficient dust storage capacities for dusts of anthropogenic and biogenic type. In particular, in the filtration of biogenic particles, such as, for example, spores or pollen grains, namely flower pollen grains, that are greater than or equal to 5 µm, very stringent requirements are, however, placed on the filter medium used.

Here there is, in particular, the requirement that the filter medium must present a high dust storage capacity between the inflow side and outflow side, while presenting a very high separation capacity and a relatively small pressure drop.

DESCRIPTION OF THE INVENTION

The invention is therefore based on the problem of providing a filter medium which presents a relatively small pressure drop with a good fractional particle efficiency and a very good dust storage capacity.

The present invention solves the above-mentioned problem by the characteristics of Claim 1.

Accordingly, the filter medium mentioned in the beginning is characterized in that the carrier layer presents first fibers which are in the form of endless bicomponent fibers and spunbonded fibers, and in that the microfiber layer presents second fibers which are in the form of endless melt blown fibers.

According to the invention, a high and efficient particle separation with relatively small pressure losses is achieved. It was found surprisingly that particularly pollen, namely flower pollen in a size range of 5-10 µm, can be separated with the two-layered filter medium according to the invention, without excessively large pressure losses occurring between the inflow side and the outflow side.

The carrier layer according to the invention is in the form of a spunbonded fabric, and it presents endless bicomponent fibers. The second fibers are applied according to the invention by a melt blow process, and they too are of the endless form. The melt blown layer surprisingly produces an excellent mechanical particle separation, particularly an excellent separation of biogenic particles.

Although, in contrast to the state of the art, no fine structure layer with mean fiber diameters in the nanometer range, but a microfiber layer with mean fiber diameters in the micrometer range, was used, very high fractional particle efficiencies were achieved.

Surprisingly, it was also found that a carrier layer made of endless spunbonded fibers with relatively high porosity, which is covered by an also relatively high porosity microfiber layer with very low surface weight, presents an extraordinarily high dust storage capacity. Here, the microfiber layer is separated primarily mechanically. The dust collects in the large pores of the carrier layer and it produces in addition a filter effect, by means of which fine dusts are separated with a very good fractional particle efficiency.

Consequently, the mentioned problem has been solved.

The bicomponent fibers can present a first component made of a first polypropylene, and a second component made of a second polypropylene, where the polypropylenes present different melting points. As a result, the bicomponent fibers can be used as binding fibers, and at the same time manufactured from a substantially single-material substance. Polypropylenes are particularly suitable for receiving a permanent electrostatic charge.

On this background, the melt blown fibers could be manufactured from polypropylene. The carrier layer advantageously presents first fibers made of polypropylene, and the microfiber layer presents second fibers made of polypropylene. As a result, a strong substance-to-substance bond between the carrier layer and the microfiber layer can be achieved.

The fibers of the carrier layer and of the microfiber layer could be manufactured from polypropylene, polyester or polycarbonate. These materials have been found to be particularly hydrophobic and chemically stable. Moreover, these materials present an excellent separation capacity with regard to pollen.

The carrier layer could present first fibers having a mean diameter in the range of 20-50 µm. In this way, a relatively coarse pored carrier layer can be achieved.

The microfiber layer could present second fibers with a mean diameter in the range of 1-15 µm. It was found surprisingly that the first and second fibers with the mentioned mean diameters produce a high separation capacity, with high dust storage capacity and moderate pressure drops.

On this background, the carrier layer could preferably present first fibers with a mean diameter in the range above 20 µm, where the microfiber layer presents second fibers with a mean diameter in the range from greater than 1 µm up to 15 µm, preferably in the range of 5-15 µm. As a result, the microfiber layer presents relatively coarse second fibers, which differ very substantially from nanofibers of a fine structure layer of the state of the art, and produce a small pressure drop between the inflow side and the outflow side, with high dust storage capacity.

It is particularly preferred if the carrier layer presents first fibers with a mean diameter which is greater than 25 µm. As a result, a coarse pored structure of the filter medium is ensured.

The microfiber layer could have a surface weight of at most 20 $g/m^2$. It was found surprisingly that this material configuration absorbs particularly advantageously dust and/or biogenic particles in the carrier layer. On this background, the microfiber layer could present a surface weight from 1 $g/m^2$ to a maximum of 20 $g/m^2$. The microfiber layer could particularly preferably present a surface weight from 1 $g/m^2$ to a maximum of 10 $g/m^2$. The second fibers, namely the microfibers, with this low-amount material configuration, surprisingly still form a sufficiently stable cover layer of the carrier layer, which retains the dusts stored in the carrier layer, in spite of exposure to pressures. Surprisingly, a microfiber layer having such a low surface weight of at most 10 $g/m^2$ produces a good mechanical separation.

The carrier layer could have a thickness of 0.6-2.0 mm. It was found surprisingly that such a large thickness of the carrier layer leads to a relatively small pressure drop, although a melt blown layer, namely the microfiber layer, is also applied to the carrier layer.

On this background, the carrier layer could present a surface weight of 40-200 g/m².

The filter medium could present a maximum tensile strength in machine direction of at least 250 N, and a maximum tensile strength in cross machine direction of at least 100 N. The values are determined according to DIN EN ISO 13934-1. These good strength values are achieved as a result of the formation of the carrier layer as a spunbonded fabric made of endless bicomponent fibers. The strength makes it possible to fold the filter medium, and shape it to a filter element, namely a folded filter.

An adsorption layer could be used to equip the filter medium and produce a combination filter. The adsorption layer can be attached downstream to the microfiber layer. As a result of this design, not only particles, but also unpleasant odors, can be adsorbed.

On this background, the adsorption layer could present activated charcoal particles. The filter medium could present an adsorption layer made of activated charcoal, zeolites or ion exchangers. As a result, noxious gases, such as, hydrocarbons, $SO_2$, NOx or the like could be adsorbed.

The activated charcoal particles are preferably glued with a polyolefin glue to the carrier layer and the microfiber layer. The carrier layer and the microfiber layer are either calendared through point-shaped bars and/or welded by ultrasound to each other.

The surface weight of the adsorption layer could be 150-500 g/m² and its thickness 0.8-3.0 mm. Surprisingly, the mentioned surface weight range and the mentioned thickness range are sufficient to satisfy the requirements for a car interior filter. Surprisingly, the adsorption layer increases the pressure drop between the inflow side and the outflow side nearly unnoticeably and moderately. A filter medium with a carrier layer, a microfiber layer, and an adsorption layer, can be used particularly in the folded state as a combination filter which adsorbs particles and noxious gases.

The carrier layer could present a porosity of at least 70%. In a particularly preferred way, the carrier layer could present a porosity of at least 80%. As a result, a very small pressure drop and a high dust storage capacity are achieved.

On this background, the microfiber layer could present a porosity of at least 70%, preferably greater than 80%. As a result, a particularly small pressure drop and a particularly high dust storage capacity are achieved.

The carrier layer and/or the microfiber layer can be charged electrostatically. Advantageously, an electrostatically charged carrier layer with relatively high porosity, which is covered by an also relatively high porosity and additionally electrostatically charged microfiber layer of very low surface weight, presents an extraordinarily high dust storage capacity.

The adsorption layer could present a nonwoven layer which is charged electrostatically. As a result, the separation capacity of a combination filter can also be increased.

The carrier layer could be manufactured from an electret filter material. As a result, an electrostatic separation of particles is possible, which is completed by combination with the predominantly mechanical separation of the microfiber layer. Here, the fibers of the microfiber layer present mean diameters which are greater than 1 μm.

A filter element for the separation of biogenic particles could comprise a flat or folded filter medium. Surprisingly, the use of the filter medium described here was found to be suitable for the separation of biogenic particles.

The filter medium is suitable for use in motor vehicles, particularly for the manufacture of car interior filters. The filter medium surprisingly presents not only excellent fractional particle efficiencies for biogenic particles which are greater than or equal to 5 μm, such as, for example, for pollen, but also for NaCl particles and other fine dusts.

On this background, in an arrangement which comprises a filter medium of the type described here or a filter element of the type described here, the carrier layer could be arranged on the inflow side and the microfiber layer on the outflow side. As a result, a filtration method can be carried out surprisingly which achieves a relatively small pressure drop, with a good fractional particle efficiency and a very good dust storage capacity. Surprisingly, the filigree microfiber layer does not become detached from the carrier layer. In a filtration method, therefore, the mentioned arrangement can be used, where a medium to be filtered is directed onto the carrier layer on the inflow side, and where the medium to be filtered is led on the outflow side through the microfiber layer.

Different possibilities now exist to elaborate and develop the teaching of the present invention advantageously. For this purpose, reference is made to the following explanation of preferred embodiment examples in reference to the drawing and tables.

Preferred embodiments and variants of the teaching are also explained in general, in connection with the explanation of the preferred embodiment examples in reference to the drawing and tables.

BRIEF DESCRIPTION OF THE DRAWINGS

In the drawing, the figures show

EMBODIMENT OF THE INVENTION

Figure 1A:
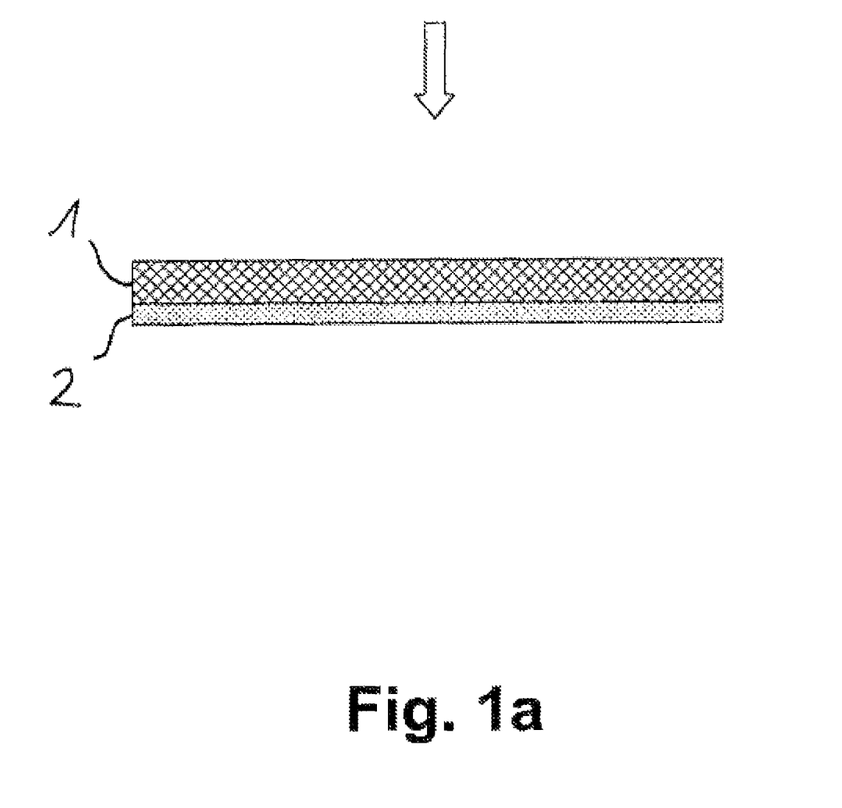
FIG. 1a a diagrammatic view of a two-layered filter medium with a carrier layer and a microfiber layer, where the arrow indicates the inflow direction, FIG. 1b a diagrammatic view of a two-layered filter medium with a carrier layer, a microfiber layer, and an additional adsorption layer, where the arrow indicates the inflow direction, FIG. 2a a scanning electron microscope view of a filter medium according to the invention made of polypropylene, FIG. 2b an additional scanning electron microscope view of a filter medium according to the invention, where it is shown that a relatively voluminous carrier layer is covered by a very thin melt blown layer.

FIG. 1a shows diagrammatically a filter medium with a carrier layer 1 and a microfiber layer 2. The arrow shows the inflow direction of the dust-laden fluid to be filtered. The fluid to be filtered impinges on the carrier layer 1 which faces the inflow side. The microfiber layer 2 faces the outflow side. The carrier layer 1 is electrostatically charged, and it separates particles electrostatically. The microfiber layer 2 separates particles predominantly mechanically.

Figure 1B:
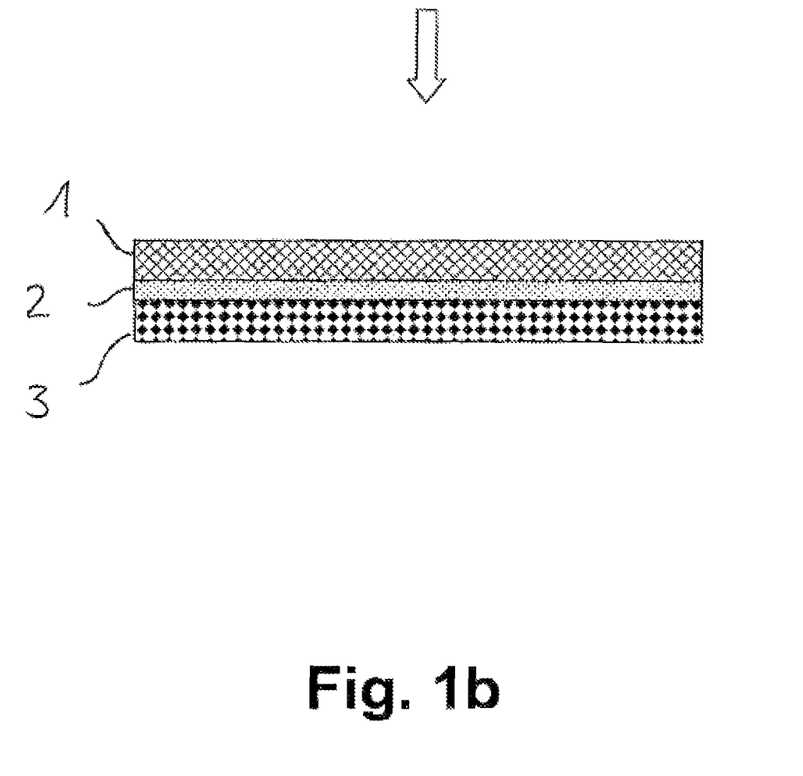

FIG. 1b shows diagrammatically a filter medium which consists of a carrier layer 1, a microfiber layer 2, and an adsorption layer 3. An adsorption layer 3 is attached to the microfiber layer 2. The arrow shows the inflow direction of the dust-laden fluid to be filtered. The fluid to be filtered impinges on the carrier layer 1 which faces the inflow side. The microfiber layer 2 faces the outflow side. The carrier layer 1 is electrostatically charged and it separates particles electrostatically. The microfiber layer 2 separates particles predominantly mechanically.

Figure 2A:
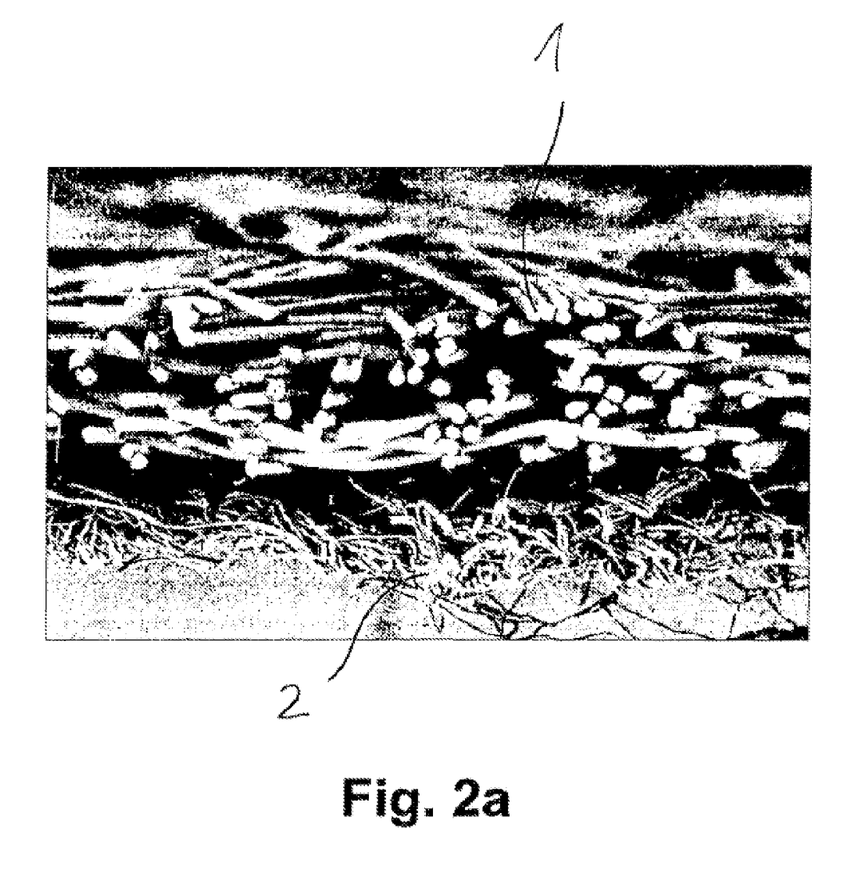

FIG. 2a shows a scanning electron microscope view of a flat filter medium. The endless fibers of the carrier layer 1 and of the microfiber layer 2 are manufactured from polypropylene. The carrier layer 1 is electrostatically loaded and it separates particles electrostatically. The microfiber layer 2 was applied by a melt blow method on the carrier layer 1. The microfiber layer 2 separates particles predominantly mechanically. The endless first fibers of the carrier layer 1 are in the form of endless bicomponent spunbonded fibers. The bicomponent fibers present a first component made of a first polypropylene and a second component made of a second polypropylene, where the polypropylenes present different melting points. The endless second fibers of the microfiber layer 2 are in the form of melt blown fibers made of polypropylene.

Figure 2B:
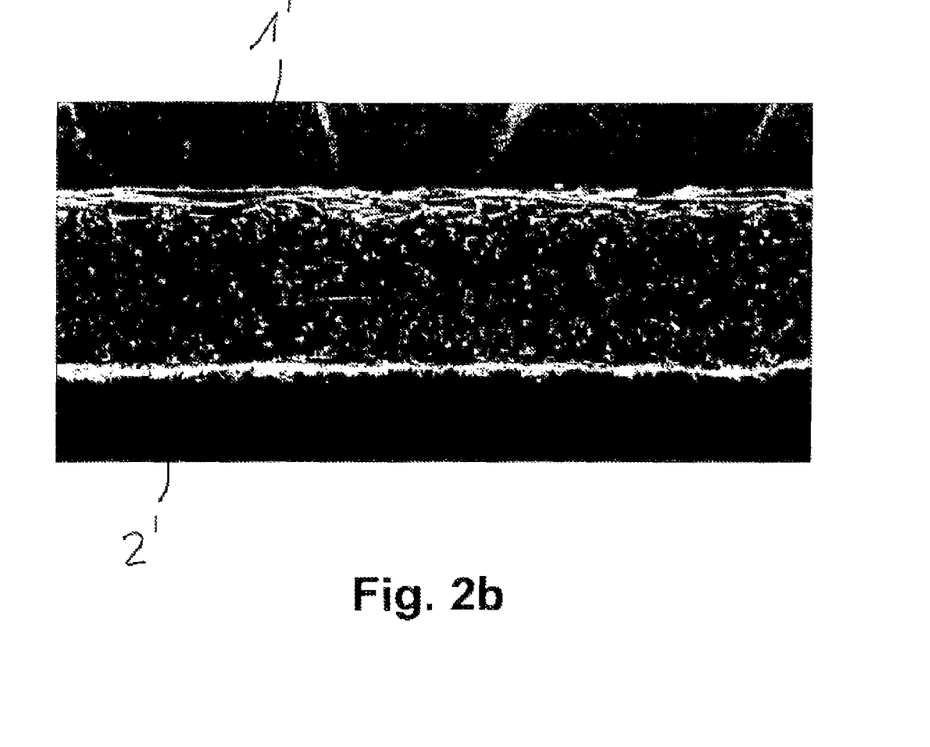

FIG. 2b shows a scanning electron microscope view of a flat filter medium. In this embodiment example, the carrier layer 1' is considerably thicker in design than the microfiber layer 2'.

The values for pressure drops, fractional particle efficiencies, and dust storage capacity are indicated in the tables and diagrams, to which reference is made explicitly hereby.

If a two-layered material is referred to in the tables, the reference is always to a filter medium according to the invention, which presents at least a carrier layer 1 and a microfiber layer 2.

Here, two embodiment examples, namely a particle filter and a combination filter with a folded filter medium described here according to the invention, were examined, and compared in each case to combination filters or particle filters with folded standard materials.

For the particle filter, a filter medium was used which consisted of a composite made of a carrier layer 1 and a microfiber layer 2. The thickness of the composite made of the carrier layer 1 and the microfiber layer 2 was 0.96 mm. The surface weight of the composite was 140 g/m². The first fibers presented a mean diameter of 35 μm, and the second fibers a mean diameter of 5 μm. This composite was folded for the manufacture of a particle filter, and formed as filter element 4 according to FIG. 9.

For the combination filter, a filter medium was used which consisted of a composite made of a carrier layer 1, a microfiber layer 2, and an adsorption layer 3 applied on the outflow side on the microfiber layer 2. The partial composite made of the carrier layer 1 and the microfiber layer 2 presented a thickness of 0.65 mm, a surface weight of 74 g/m², first fibers with a mean diameter of 25 μm, and second fibers with a mean diameter of 5 μm. The adsorption layer 3 presented a thickness of 1.1 mm and a surface weight of 370 g/m². The composite made of carrier layer 1, microfiber layer 2, and adsorption layer 3 was folded for the manufacture of a combination filter, and formed as filter element 4 according to FIG. 9.

The fibers of the carrier layers 1 and microfiber layers 2 of the embodiment examples were manufactured from polypropylene. The bicomponent fibers of the carrier layers 1 consist of polypropylene components with different melting points. The melt blown fibers also consist of polypropylene.

As standard material for the comparative investigations, the material AF 933 from Freudenberg Vliesstoffe K G, Weinheim, D E was used for the particle filter. It presented a thickness of 0.68 mm and a surface weight of 138 g/m². This standard material was folded, and, for the manufacture of a particle filter, it was formed as filter element according to FIG. 9.

As standard material for comparative investigations, the material AF 935 from Freudenberg Vliesstoffe K G, Weinheim, D E, provided with an adsorption layer, was used for the combination filter. This material presented a thickness of 1.53 mm and a surface weight of 440 g/m². This standard material was folded, and formed as filter element according to FIG. 9 for the manufacture of a combination filter.

Table 1 shows first the pressure drop in Pa between the inflow side and the outflow side, the permeability in % (100–fractional particle efficiency in %), and the air permeability at 200 Pa in L/(min*m²) of a two-layered, unfolded and flat filter medium of the type described here, without adsorption layer, with a porosity of 80-90% and a thickness of 0.6-1 mm. The flat, unfolded filter medium is characterized by an air permeability of at least 1700 L/(min*m²) with a pressure difference of 200 Pa between the inflow side and the outflow side. In concrete terms, the values mentioned in Table 1 were measured.

TABLE 1

|  | 2-layered material |
|---|---|
| Pressure drop [Pa] | 5 |
| Permeability [%] | 35 |
| Air permeability at 200 Pa [L/min m²] | 2300 |
| Porosity [%] | 88 |
| Carrier thickness [mm] | 0.65 |

Figure 3:
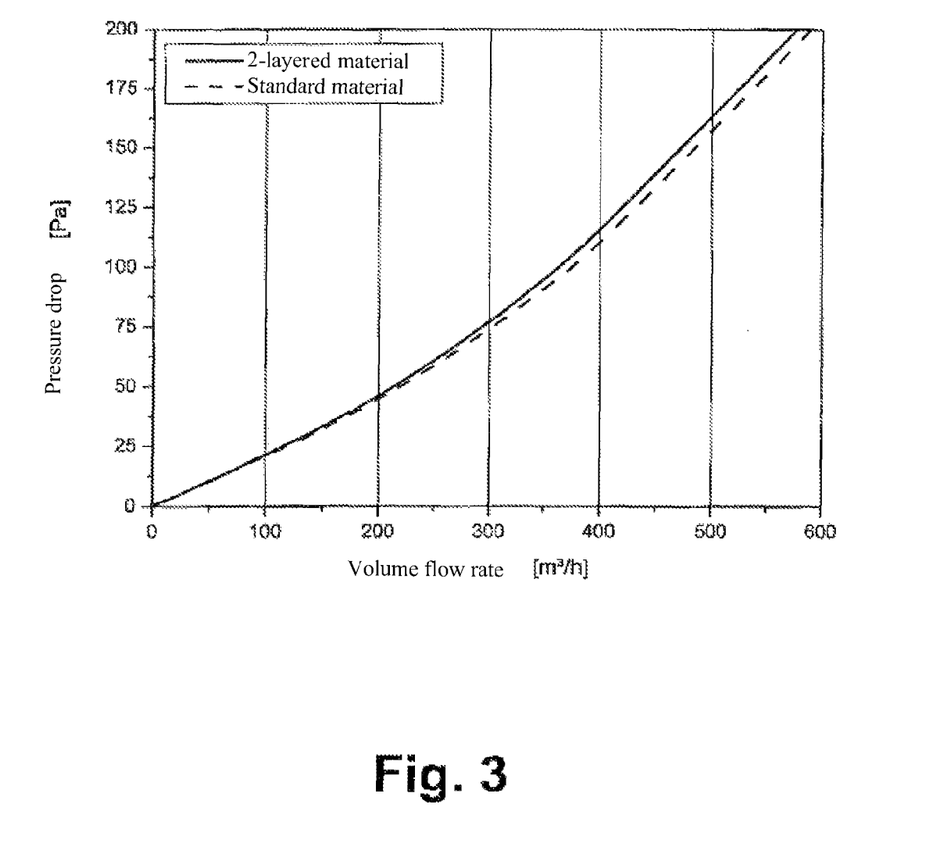
FIG. 3 shows a diagram in which the pressure drop of a combination filter with a folded filter medium described here is compared to the pressure drop of a combination filter with a folded standard material.

Table 2 shows the pressure drop in Pa between the inflow side and the outflow side as a function of the volume flow rate in m³/h, where a folded filter medium with an adsorption layer (combination filter) is compared to a combination filter with a standard material of type AF 935 from Freudenberg Vliesstoffe K G, Weinheim, D E, which material is provided with an adsorption layer. The compared filter media are formed as filter element 4 according to FIG. 9. The filter element had the dimensions 240×190×22 mm. The filter surface area A was 0.21 m². FIG. 3 shows the values of Table 2 in a diagram.

TABLE 2

| Volume flow rate [m³/h] | 2-layered material Pressure drop [Pa] | Standard Pressure drop [Pa] |
|---|---|---|
| 180 | 37 | 36 |
| 300 | 75 | 72 |
| 420 | 125 | 119 |
| 600 | 211 | 205 |

Figure 4:
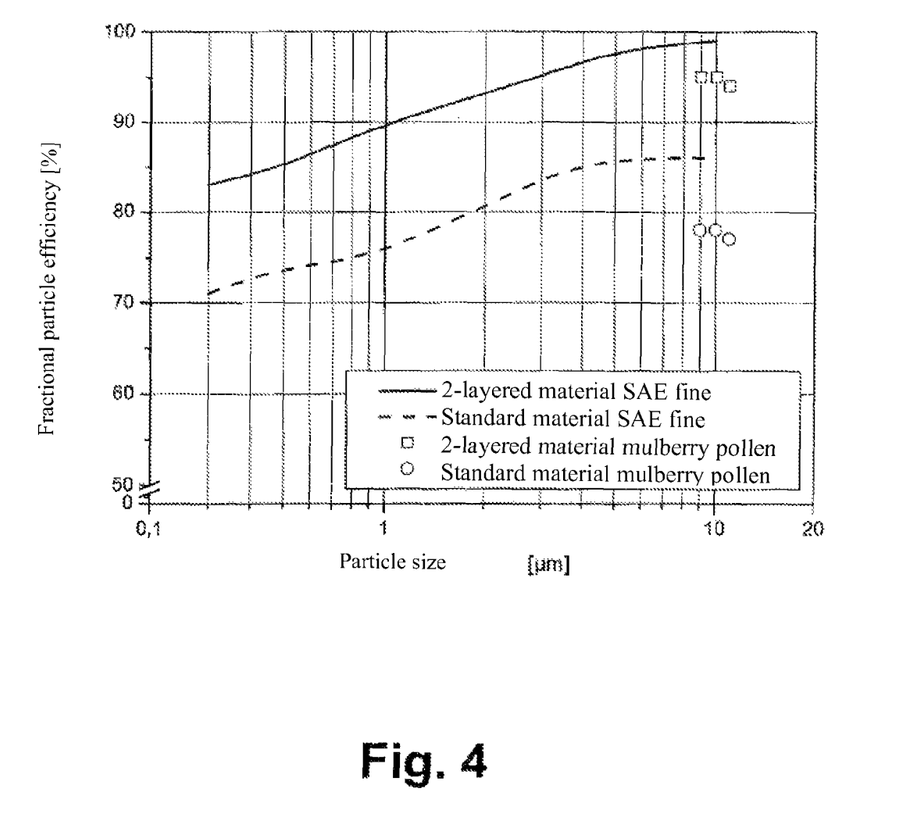
FIG. 4 shows a diagram in which the fractional particle efficiency of a combination filter with a folded filter medium described here is compared to the fractional particle efficiency of a combination filter with a folded standard material.

Table 3 shows the fractional particle efficiency (=particle efficiency in the tables) of SAE fine dust according to DIN 71460 Part 1, with a volume flow rate of 300 m³/h. The respective particle diameter of the SAE fine dust was determined optically. The fractional particle efficiencies of a folded filter medium with adsorption layer (combination filter) and of a combination filter with a standard material of type AF 935, provided with an adsorption layer, was measured as a function of the optically determined particle diameter (=particle size in the diagram). The compared filter media were formed as filter element 4 according to FIG. 9. FIG. 4 shows the values of Table 3 in a diagram.

TABLE 3

| Optical particle diameter [µm] | 2-layered material Particle efficiency [%] | Standard Particle efficiency [%] |
| --- | --- | --- |
| 0.3 | 83 | 71 |
| 0.5 | 85 | 74 |
| 1.0 | 90 | 75 |
| 3.0 | 95 | 84 |
| 5.0 | 98 | 86 |
| 10.0 | 99 | 86 |

A filter element which is developed as a combination filter, and which presents a folded filter medium of the type described here, is characterized by a fractional particle efficiency with respect to SAE fine particles in the range of 1-10 µm of at least 90%, with a pressure drop between the inflow side and the outflow side of at most 90 Pa, and with a volume flow rate of 300 m$^3$/h and an inflow surface area of 0.21 m$^2$.

The mentioned filter element is characterized by a fractional particle efficiency with respect to SAE fine particles in the range of 0.1-1 µm of at least 80%, with a pressure drop between the inflow side and the outflow side of at most 90 Pa, and with a volume flow rate of 300 m$^3$/h and an inflow surface area of 0.21 m$^2$.

Table 4 shows the fractional particle efficiency of mulberry pollen according to DIN 71460 Part 1, with a volume flow rate of 300 m$^3$/h. The respective particle diameter of the mulberry pollen was determined optically. The fractional particle efficiencies of a folded filter medium with adsorption layer (combination filter) and of a combination filter with a standard material of type AF 935, provided with an adsorption layer, were measured as a function of the optically determined particle diameter (=particle size in the diagram). FIG. 4 shows a diagram in which the values of Tables 3 and 4 are plotted for comparison. The compared filter media were in a filter element 4 according to FIG. 9.

TABLE 4

| Optical particle diameter [µm] | 2-layered material Particle efficiency [%] | Standard Particle efficiency [%] |
| --- | --- | --- |
| 9 | 95 | 79 |
| 10 | 95 | 79 |
| 11 | 94 | 77 |

A filter element which is developed as a combination filter, and which presents a folded filter medium of the type described here is characterized by a fractional particle efficiency with respect to mulberry pollen of size 10 µm of at least 95%, with a pressure drop between the inflow side and the outflow side of at most 90 Pa, and with a volume flow rate of 300 m$^3$/h and an inflow surface area of 0.21 m$^2$.

Figure 5:
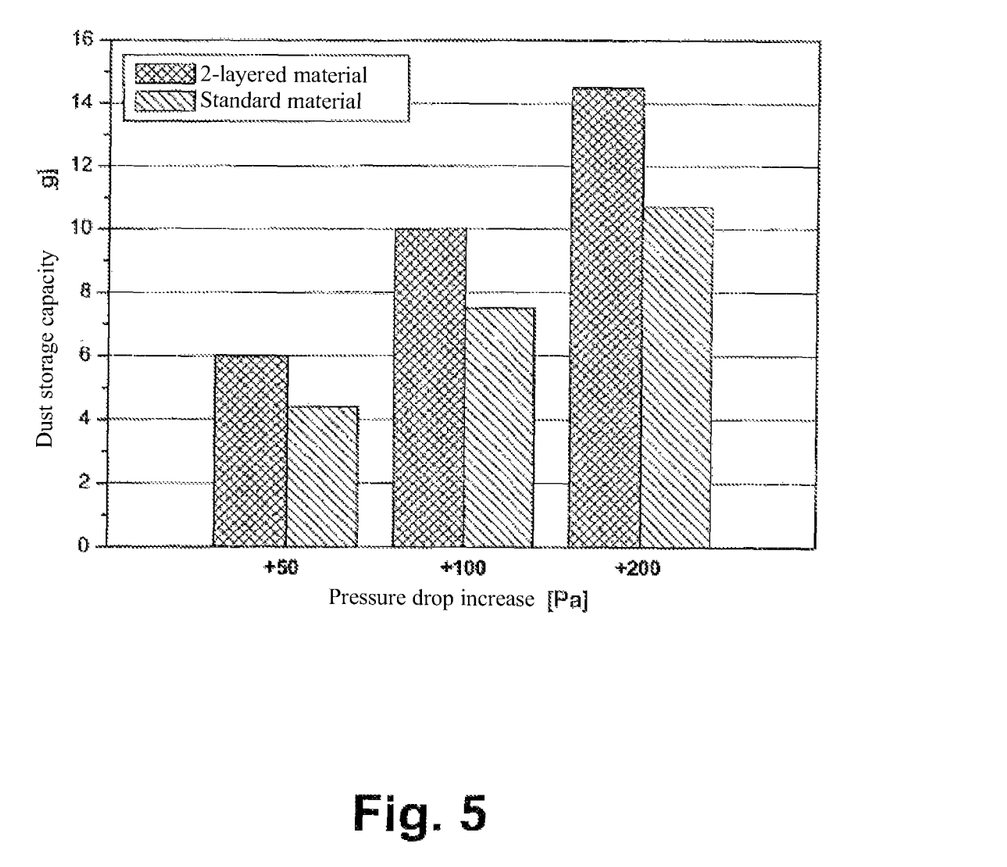
FIG. 5 shows a diagram in which the dust storage capacity of a combination filter with a folded filter medium described here is represented.

Table 5 shows the dust storage capacity in g of a SAE fine dust according to DIN 71460 Part 1, with a volume flow rate of 360 m$^3$/h. The dust storage capacity of a folded medium with adsorption layer (combination filter) was measured with certain pressure drop increases in Pa, and compared to the values of a combination with a standard material of type AF 935, provided with an adsorption layer. FIG. 5 shows the values of Table 5 in a bar diagram.

TABLE 5

| Pressure drop increase [Pa] | 2-layered material DSC [Dust Storage Capacity] [g] | Standard DSC [g] |
| --- | --- | --- |
| +50 Pa | 6.0 | 4.4 |
| +100 Pa | 10.0 | 7.5 |
| +200 Pa | 14.5 | 10.7 |

A filter element which is developed as a particle filter, and which presents a folded filter medium of the type described here is characterized by a dust storage capacity with respect to SAE fine dust of 10 g, with a pressure drop increase between the inflow side and the outflow side of at most 100 Pa, and with a volume flow rate of 360 m$^3$/h and an inflow surface area of 0.21 m$^2$.

Figure 6:
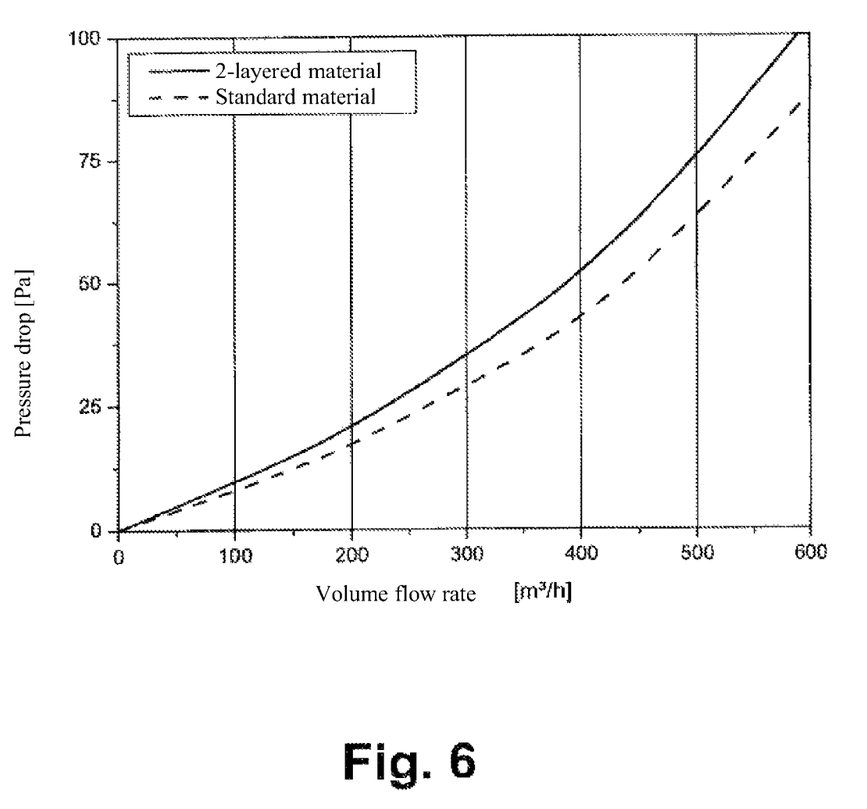
FIG. 6 shows a diagram in which the pressure drop of a particle filter with a folded filter medium described here is compared to the pressure drop of a particle filter with a folded standard material.

Table 6 shows the pressure drop in Pa between the inflow side and the outflow side as a function of the volume flow rate in m$^3$/h, where a folded, two-layered filter medium (particle filter) is compared to a particle filter with a standard material of type AF 933 from Freudenberg Vliesstoffe K G, Weinheim, D E. The compared filter media were accommodated in a filter element according to FIG. 9 with dimensions 250×200×30 mm. The filter surface area A was 0.56 m$^2$. FIG. 6 shows the values of Table 6 in a diagram.

TABLE 6

| Volume flow rate [m$^3$/h] | 2-layered material Pressure drop [Pa] | Standard Pressure drop [Pa] |
| --- | --- | --- |
| 180 | 17 | 20 |
| 300 | 35 | 40 |
| 420 | 58 | 65 |
| 600 | 103 | 115 |

Table 7 shows the fractional particle efficiency for SAE fine dust according to DIN 71460 Part 1, with a volume flow rate of 300 m$^3$/h. The respective particle diameter of the SAE fine dust was determined optically. The fractional particle efficiencies of a folded, two-layered filter medium (particle filter) and of a particle filter with standard material of type AF 933 were measured as a function of the optically determined particle diameter.

TABLE 7

| Optical particle diameter [µm] | 2-layered material Particle efficiency [%] | Standard Particle efficiency [%] |
| --- | --- | --- |
| 0.3 | 92 | 88 |
| 0.5 | 94 | 90 |
| 1.0 | 96 | 92 |
| 3.0 | 98 | 96 |
| 5.0 | 99 | 97 |
| 10.0 | 100 | 98 |

A filter element which is developed as a particle filter, and which presents a folded filter medium of the type described here is characterized by a fractional particle efficiency with respect to particles in the range of 1-10 µm of at least 90%, with a pressure drop between the inflow side and the outflow side of at most 60 Pa, and with a volume flow rate of 300 m$^3$/h and an inflow surface area of 0.56 m$^2$.

Figure 7:
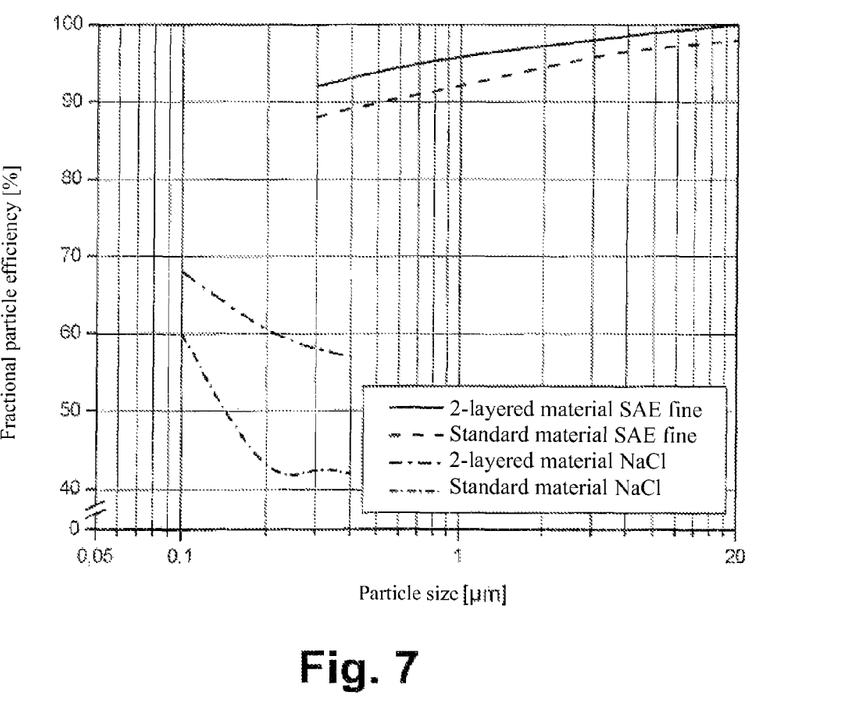
FIG. 7 shows a diagram in which the fractional particle efficiency of a particle filter with a folded filter medium described here is compared to the fractional particle efficiency of a particle filter with a folded standard material.

Table 8 shows the fractional particle efficiency of NaCl according to DIN 71460 Part 1 with a volume flow rate of 300 m$^3$/h. The respective particle diameter of NaCl was determined optically. The fractional particle efficiencies of a folded, two-layered filter medium (particle filter) and of a particle filter with a standard material of type AF 933 were measured as a function of the optically determined particle diameter (=particle size in the diagram). FIG. 7 shows a diagram in which the values of Tables 7 and 8 are plotted for comparison. Although NaCl is not electrically charged to the same extent as SAE dust, very good fractional particle efficiencies are nonetheless achieved.

TABLE 8

| Optical particle diameter [μm] | 2-layered material Particle efficiency [%] | Standard Particle efficiency [%] |
| --- | --- | --- |
| 0.1 | 68 | 60 |
| 0.2 | 60 | 40 |
| 0.3 | 58 | 43 |
| 0.4 | 57 | 42 |

A filter element which is developed as a particle filter, and which presents a folded filter medium of the type described here is characterized by a fractional particle efficiency with respect to NaCl particles in the range of 0.1-0.4 μm of at least 57%, with a pressure drop between the inflow side and the outflow side of at most 40 Pa, and with a volume flow rate of 300 m$^3$/h and an inflow surface area of 0.56 m$^2$.

Figure 8:
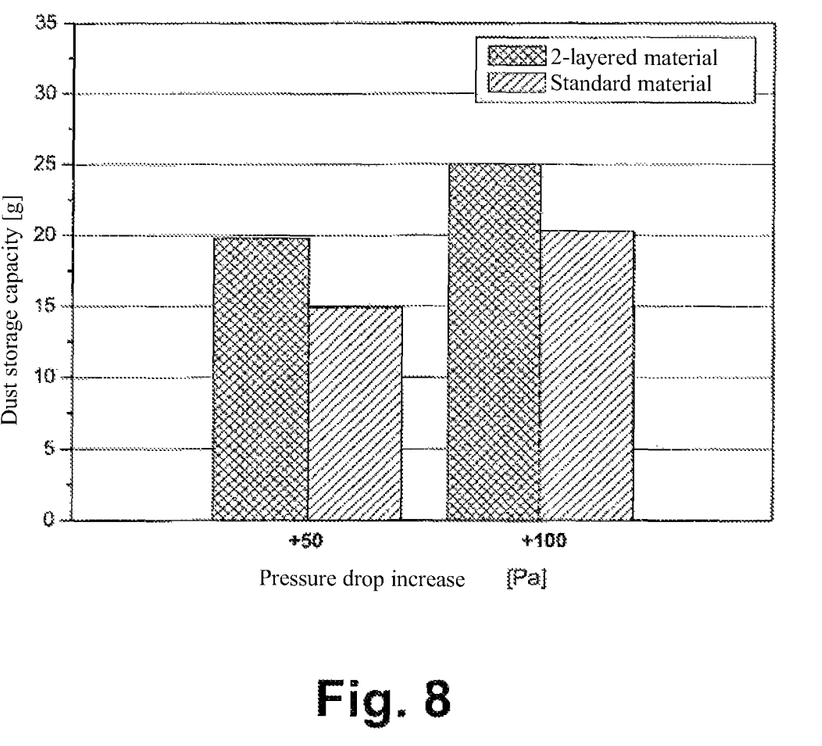
FIG. 8 shows a diagram in which the dust storage capacity of a particle filter with a folded filter medium described here is compared to the dust storage capacity of a particle filter with a folded standard material.

Table 9 shows the dust storage capacity in g of a SAE fine dust according to DIN 71460 Part 1 with a volume flow rate of 300 m$^3$/h. The dust storage capacity of a folded, two-layered filter medium (particle filter) with certain pressure drop increases was measured in Pa. The values of the particle filter with the filter medium described here were compared to the values which were measured with a particle filter with a standard material of type AF 933. FIG. 8 shows the values of Table 9 in a bar diagram.

TABLE 9

| Pressure drop increase [Pa] | 2-layered material DSC [g] | Standard DSC [g] |
| --- | --- | --- |
| +50 Pa | 19.8 | 14.9 |
| +100 Pa | 25.0 | 20.3 |
| +200 Pa | 32.3 | |

A filter element which is developed as a particle filter, and which presents a folded filter medium of the type described here is characterized by a dust storage capacity with respect to SAE fine dust of 25 g, with a pressure drop increase between the inflow side and the outflow side of at most 100 Pa, and with a volume flow rate of 300 m$^3$/h and an inflow surface area of 0.56 m$^2$.

Figure 9:
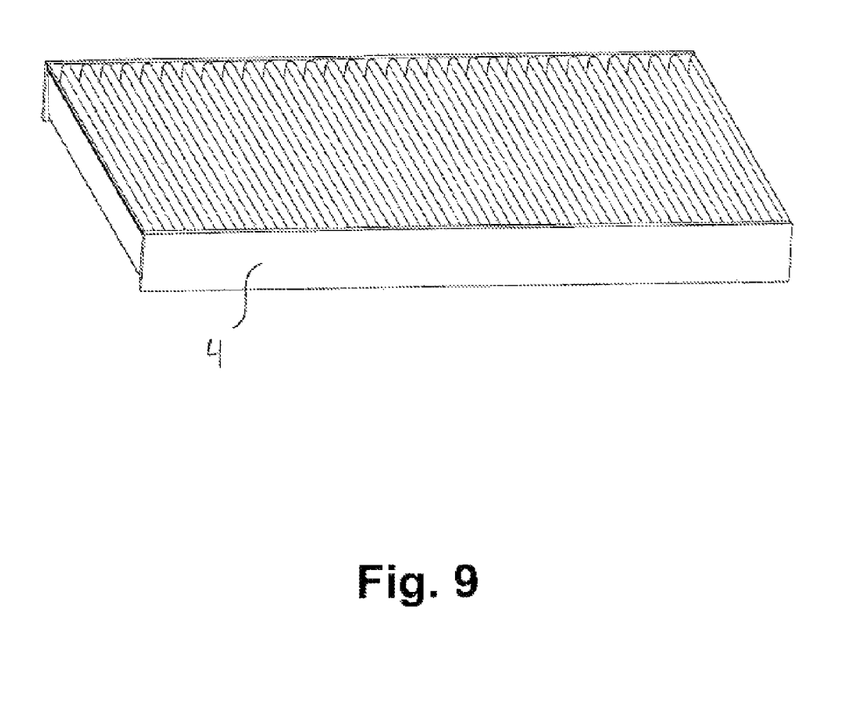
FIG. 9 is a diagrammatic view of a filter element with a folded filter medium.

FIG. 9 shows diagrammatically a filter element 4 which is manufactured from a folded material of the type described here. The filter medium can consist of a carrier layer 1 and a microfiber layer 2. The filter medium can consist of a carrier layer 1, a microfiber layer 2, and an adsorption layer 3.

With regard to further advantageous embodiments and variants of the teaching according to the invention, reference is made to the general portion of the description, on the one hand, and to the attached claims, on the other hand.

What is claimed is:

1. A filter medium comprising a carrier layer and a microfiber layer applied to the carrier layer, wherein the carrier layer includes first fibers which are in the form of spunbonded endless bicomponent fibers, and the microfiber layer includes second fibers which are in the form of endless melt blown fibers.

2. The filter medium according to claim 1, wherein the bicomponent fibers include a first component made of a first polypropylene, and a second component made of a second polypropylene, where the first and second polypropylenes have different melting points.

3. The filter medium according to claim 1, wherein the melt blown fibers are manufactured from polypropylene.

4. The filter medium according to claim 1, wherein the carrier layer includes first fibers with a mean diameter in the range of 20-50 μm.

5. The filter medium according to claim 1, wherein the microfiber layer includes second fibers with a mean diameter in the range of 1-15 μm.

6. The filter medium according to claim 1, wherein the microfiber layer includes a surface weight of at most 20 g/m$^2$.

7. The filter medium according to claim 1, wherein the carrier layer has a thickness of 0.6-2.0 mm.

8. The filter medium according to claim 1, including a maximum tensile strength in machine direction of at least 250 N, and a maximum tensile strength in cross machine direction of at least 100 N.

9. The filter medium according to claim 1, further including an adsorption layer which equips the filter medium to produce a combination filter.

10. The filter medium according to claim 1, wherein the carrier layer has a porosity of at least 70%, and the microfiber layer has a porosity of at least 70%.

11. The filter medium according to claim 1, wherein the carrier layer and/or the microfiber layer is/are electrostatically charged.

12. The filter medium according to claim 9, wherein the adsorption layer includes a nonwoven layer which is electrostatically charged.

13. The filter medium according to claim 1, including an air permeability of at least 1700 L/(min*m$^2$) with a pressure difference of 200 Pa between the inflow side and the outflow side.

14. A filter element comprising a folded filter medium according to claim 1.

15. An arrangement comprising a filter medium according to claim 1, wherein the carrier layer is arranged on an inflow side and the microfiber layer on an outflow side.

16. The filter element according to claim 14, wherein the carrier layer is arranged on the inflow side and the microfiber layer on the outflow side.

* * * * *